US008239051B2

(12) United States Patent
Hataida

(10) Patent No.: US 8,239,051 B2
(45) Date of Patent: Aug. 7, 2012

(54) INFORMATION PROCESSING APPARATUS AND INFORMATION PROCESSING METHOD

(75) Inventor: Makoto Hataida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 316 days.

(21) Appl. No.: 12/382,487

(22) Filed: Mar. 17, 2009

(65) Prior Publication Data
US 2009/0307535 A1 Dec. 10, 2009

(30) Foreign Application Priority Data

Jun. 4, 2008 (JP) ................................ 2008-147386

(51) Int. Cl.
*G06F 17/00* (2006.01)
(52) U.S. Cl. ........................................... 700/94; 714/48
(58) Field of Classification Search .................... 700/94; 714/48
See application file for complete search history.

(56) References Cited

U.S. PATENT DOCUMENTS

| 5,371,734 | A | * | 12/1994 | Fischer | 370/311 |
|---|---|---|---|---|---|
| 5,388,215 | A | * | 2/1995 | Baker et al. | 709/229 |
| 5,535,336 | A | * | 7/1996 | Smith et al. | 709/225 |
| 5,701,502 | A | * | 12/1997 | Baker et al. | 709/201 |
| 6,826,123 | B1 | * | 11/2004 | Herring | 368/46 |
| 7,124,101 | B1 | * | 10/2006 | Mikurak | 705/35 |
| 7,145,837 | B2 | * | 12/2006 | Herring et al. | 368/46 |
| 7,200,144 | B2 | * | 4/2007 | Terrell et al. | 370/389 |
| 7,292,567 | B2 | * | 11/2007 | Terrell et al. | 370/363 |
| 7,389,462 | B1 | * | 6/2008 | Wang et al. | 714/748 |
| 7,460,473 | B1 | * | 12/2008 | Kodama et al. | 370/230 |
| 7,594,002 | B1 | * | 9/2009 | Thorpe et al. | 709/219 |
| 7,668,923 | B2 | * | 2/2010 | Herring et al. | 709/209 |
| 7,716,077 | B1 | * | 5/2010 | Mikurak | 705/7.12 |
| 2001/0034223 | A1 | * | 10/2001 | Rieser et al. | 455/404 |
| 2003/0097481 | A1 | * | 5/2003 | Richter | 709/251 |
| 2003/0189930 | A1 | * | 10/2003 | Terrell et al. | 370/389 |
| 2003/0189936 | A1 | * | 10/2003 | Terrell et al. | 370/395.31 |
| 2004/0064351 | A1 | * | 4/2004 | Mikurak | 705/7 |
| 2004/0236874 | A1 | * | 11/2004 | Largman et al. | 710/8 |
| 2004/0243978 | A1 | * | 12/2004 | Walmsley | 717/120 |
| 2005/0078559 | A1 | * | 4/2005 | Herring | 368/46 |
| 2005/0078708 | A1 | * | 4/2005 | Bender et al. | 370/475 |
| 2005/0080869 | A1 | * | 4/2005 | Bender et al. | 709/212 |
| 2005/0080920 | A1 | * | 4/2005 | Bender et al. | 709/236 |
| 2005/0080933 | A1 | * | 4/2005 | Herring | 709/249 |
| 2005/0080945 | A1 | * | 4/2005 | Carroll | 710/33 |

(Continued)

FOREIGN PATENT DOCUMENTS

JP 2001-166965 6/2001

*Primary Examiner* — Albert Decady
*Assistant Examiner* — Anthony Whittington
(74) *Attorney, Agent, or Firm* — Staas & Halsey LLP

(57) ABSTRACT

An information processing apparatus includes a node, and a system controlling apparatus connected to the node. The node includes a first detecting unit that detects first error information, a second detecting unit that detects second error information, a retaining unit that retains the first and the second error information, and a temporary retaining unit that retains new first error information and new second error information, and when the first or second error information is initialized, causes the retaining unit to store error information corresponding to the initialized first or second error information. The system controlling apparatus includes a controlling unit connected to the retaining unit, and a firmware that causes the controlling unit to read into the first and second error information and to initialize the new first or second error information.

8 Claims, 7 Drawing Sheets

U.S. PATENT DOCUMENTS

| | | | |
|---|---|---|---|
| 2005/0081080 A1* | 4/2005 | Bender et al. | 714/2 |
| 2005/0091383 A1* | 4/2005 | Bender et al. | 709/228 |
| 2005/0135419 A1* | 6/2005 | Pullen et al. | 370/473 |
| 2005/0193408 A1* | 9/2005 | Sull et al. | 725/32 |
| 2006/0161460 A1* | 7/2006 | Smitherman et al. | 705/3 |
| 2006/0178918 A1* | 8/2006 | Mikurak | 705/7 |
| 2006/0195340 A1* | 8/2006 | Smitherman et al. | 705/2 |
| 2007/0006150 A9* | 1/2007 | Walmsley | 717/120 |
| 2007/0183421 A1* | 8/2007 | Terrell et al. | 370/389 |
| 2007/0265972 A1* | 11/2007 | Tsutsui | 705/52 |
| 2008/0008202 A1* | 1/2008 | Terrell et al. | 370/401 |
| 2008/0240105 A1* | 10/2008 | Abdallah | 370/392 |
| 2008/0244743 A1* | 10/2008 | Largman et al. | 726/23 |
| 2009/0092153 A1* | 4/2009 | Howard et al. | 370/474 |
| 2009/0172687 A1* | 7/2009 | Bobak et al. | 718/104 |
| 2009/0216910 A1* | 8/2009 | Duchesneau | 709/250 |
| 2010/0005531 A1* | 1/2010 | Largman et al. | 726/24 |

* cited by examiner

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2008-147386, filed on Jun. 4, 2008, the entire contents of which are incorporated herein by reference.

FIELD

The embodiment discussed herein is directed to an information processing apparatus including a node and a system controlling apparatus connected to the node, and an information processing method.

BACKGROUND

Conventionally, in an exemplary computer system having a fault detecting function, a Fault Location algorithm is implemented on firmware. With such an algorithm, when a fault at one point is spread to cause error reports to be issued from a plurality of node to firmware all at once, the fault causing such a situation as above is specified based on these plural error reports (refer to Japanese Laid-open Patent Publication No. 2001-166965).

In this system, an error at an output portion of one node and an error at an input portion of on an input-destination node of a bus connecting to the output portion may be simultaneously detected and are individually reported to the firmware. In this case, such an algorithm can be thought as that the firmware receiving two error reports checks the contents of these two errors and indicates only the node on an output side as a suspicious component when these two errors match each other, and an input side ignores the other as a spread error.

However, the conventional technology has a problem in which a suspicious component cannot be correctly specified due to a time difference of clear timing of the firmware.

Specifically, error information is cleared by the firmware in the system explained above for each node via a shared bus for system management. Therefore, a time difference in access for clearing necessarily occurs. For this reason, if a fault is such that errors successively occur at short intervals close to the access time, the firmware cannot specify only the node on an output side as a suspicious component (error portion), overly specifying also the node on an input side as a suspicious component.

For example, an example of the case explained above in which the firmware overly specifies suspicious components is explained by using FIG. 9. As depicted in FIG. 9, when a first error occurs on output-side node A and an invalid packet is transferred to an input-side node B, the nodes A and B each output an error interrupt to firmware. The firmware makes subsequent error reports once masked, first logs (records) and then clears error information about the input-side node B, and then logs and then clears error information about the output-side node A. Here, for simplification of firmware processing, the processing order of the nodes are fixed.

Then, it is assumed that a second error of the same type occurs between clear processes of the nodes B and A. At the output-side node A, when trying to clear the first error, the firmware inadvertently clears information about the second error, and therefore the second error information is not left in the log register. However, at the node B, after performing a clearing process, the firmware detects the second error, and therefore the second error information is logged and left. As a result, after canceling error interrupt mask to allow an error interrupt to be accepted, the firmware receives only an error interrupt from the input-side node B. Thus, in error analysis, the firmware erroneously determines that the original error is the error at the input-side node B, resulting in overly specifying the input-side node as a suspicious component.

SUMMARY

According to an aspect of the invention, an information processing apparatus includes a node; and a system controlling apparatus connected to the node.

The node includes a first detecting unit that detects first error information; a second detecting unit that detects second error information different from the first error information; a retaining unit that retains the first error information and the second error information at corresponding bit positions; and a temporary retaining unit that retains new first error information that is different from the first error information stored in the retaining unit and is newly detected by the first detecting unit and new second error information that is different from the second error information stored in the retaining unit and is newly detected by the second detecting unit, in corresponding bit positions, and when the first or second error information retained in the retaining unit is initialized by the system controlling apparatus, causes the retaining unit to store error information corresponding to the initialized first or second error information from among the retained new first and second error information.

The system controlling apparatus includes a controlling unit connected to the retaining unit; and a firmware that causes the controlling unit to read into the first and second error information retained in the retaining unit and causes the controlling unit to initialize the new first or second error information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained in detail below with reference to the accompanying drawings. In the following, general outlines and features of the information processing apparatus according to the present embodiment and the configuration and flow of process of the information processing apparatus are explained in this sequence, and then finally various modifications of the present embodiments are explained.

[First Embodiment]
[General Outlines and Feature of the Information Processing Apparatus]

First, the general outlines and features of the information processing apparatus according to a first embodiment are explained. In summary, the information processing apparatus according to the present embodiment detects and analyzes a hard error occurring at a node connected to a Management Board (MMB), which is one type of a system controlling apparatus (also referred to as Service Processor (SVP) executing and controlling firmware, thereby specifying a suspicious component where the error occurs. In particular, a main feature is that firmware can correctly specify a suspicious component without awareness and irrespectively of the time difference in clear timing of the firmware.

This main feature is now specifically explained. Each node in the information processing apparatus according to the present embodiment includes a temporary retaining register configured similarly to an error log register that retains detected error information (for example, a level or message indicative of a fault state of hardware). When an error that is of the same type already set in the error log register occurs, each node sets information set in the error log register to the temporary retaining register. Then, when the error log register is cleared by firmware of an MMB, the node sets the information retained in the temporary retaining register in the error log register.

That is, when an error of a node is cleared, that node can know that an error of the same type is set in the temporary retaining register. Therefore, after the error log register is cleared, the bit corresponding to that of the temporary retaining register is copied. Then, the node clears the bit of the temporary retaining register. With this, even when successively detecting errors, both error information can be correctly output to the firmware. After error mask is cancelled, the firmware can correctly receive both error information.

In this manner, in the information processing apparatus according to the first embodiment, as in the main feature, firmware can correctly specify a suspicious component without awareness and irrespectively of the time difference in clear timing of the firmware.

[Configuration of the Information Processing Apparatus]

Figure 1:
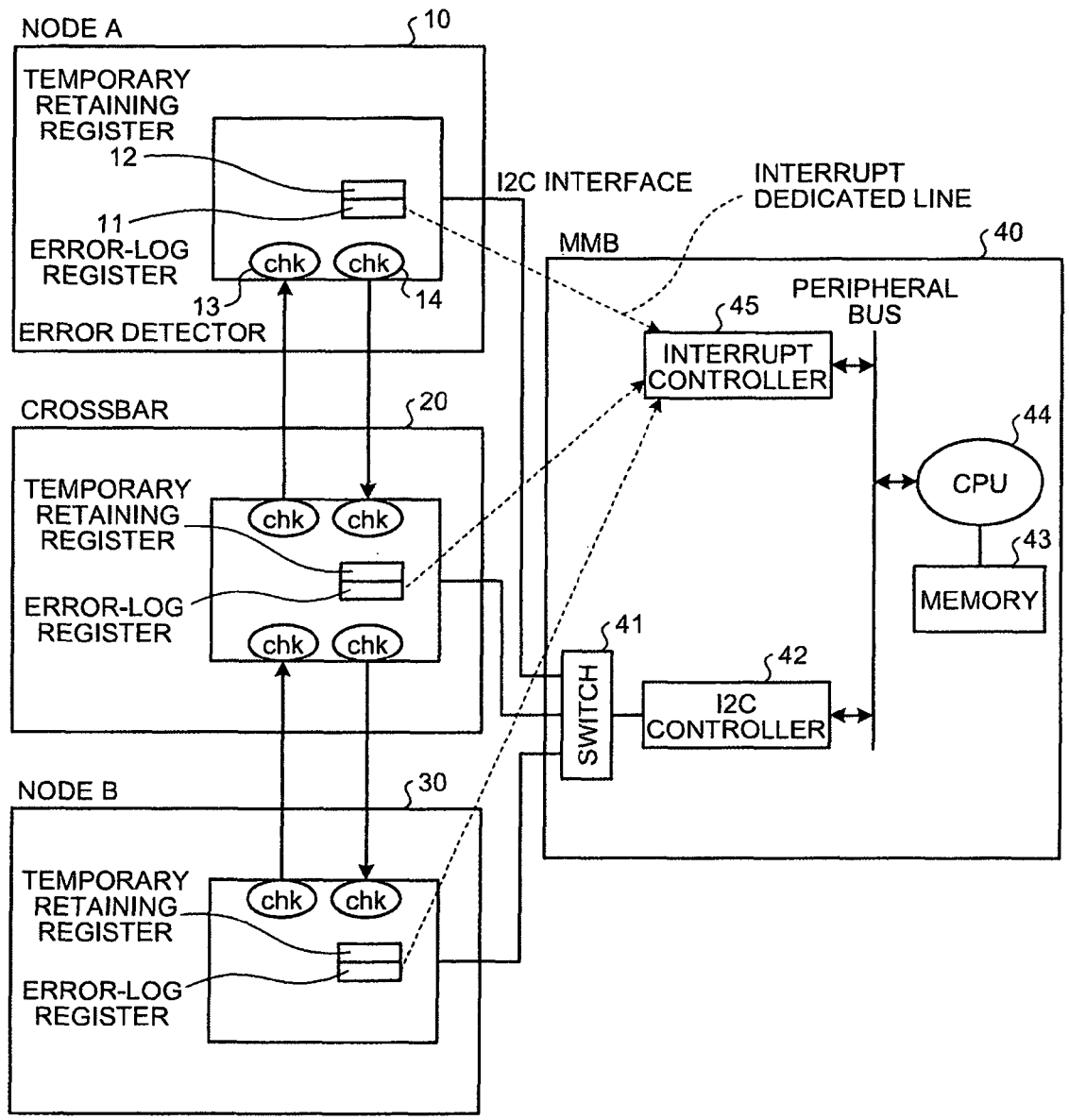
FIG. 1 is a block diagram of the configuration of an information processing apparatus according to a first embodiment.

Next, the configuration of the information processing apparatus is explained by using FIG. 1. FIG. 1 is a block diagram of the configuration of the information processing apparatus according to the first embodiment. As depicted in FIG. 1, the information processing apparatus includes a node A 10, a crossbar 20, a node B 30 and an MMB 40. Among the node A 10, the crossbar 20, and the node B 30, processing units particularly closely related to the present invention are identical each other. Therefore, only the node A 10 is explained herein.

(Configuration of the Node A 10)

The node A 10 is a device connected to the MMB 40, such as a System Board (SB), an Input/Output Board (IOB), and a crossbar switch (crossbar), via an Inter-Integrated Circuit (I2C) interface. As for components particularly closely related to the present embodiment, the node A 10 includes an error log register 11, a temporary retaining register 12, an error detector 13, and an error detector 14.

The error log register 11 retains error information about errors detected by the error detector 13 or 14, which will be explained further below. Specifically, the error log register 11 retains error information for each bit corresponding to hardware in the node A 10. For example, when an error is detected by the error detector 14 and error information is reported to the error log register 11, the error log register 11 retains that error information in a position corresponding to the bit position in hardware where the error occurs.

Then, when retaining the error information reported by the error detector 13 or 14, which will be explained further below, the error log register 11 outputs an interrupt request to an interrupt controller 45 of the MMB 40 via an interrupt dedicated line.

The temporary retaining register 12 is a retaining unit having a configuration similar to that of the error log register 11. Specifically, for example, it is assumed that the error log register 11 retains error information about an error detected by the error detector 14. In this case, the temporary retaining register 12 retains same-type error information reported by the error detector 14 detecting an error that is of the same type as that of the error information retained in the error log register 11 at the same bit position as that of the error information retained in the error log register 11.

Then, when the error information retained in the error log register 11 is cleared by firmware of the MMB 40, the temporary retaining register 12 obtains the same-type error information retained at the bit position corresponding to the cleared error information. The temporary retaining register 12 then stores the obtained same-type error information at the bit position corresponding to the error information cleared in the error log register 11.

The error detector 13 detects an error in hardware in the node A 10, and also accepts error information detected in another node. Specifically, for example, the error detector 13 detects an error in hardware in the node A 10, and reports error information about the detected error to the error log register 11. Then, the error detector 13 stores the error information in a bit position corresponding to the hardware where the error is detected among the bits of the error log register 11.

Also, when accepting error information about an error detected in another node, the error detector 13 outputs an interrupt request for that error information via an interrupt dedicated line to the interrupt controller 45 of the MMB 40.

The error detector 14 detects an error in hardware in the node A 10, and also reports to another node that the error has been detected. Specifically, for example, the error detector 14 detects an error in hardware in the node A 10, and reports error information about the detected error to the error log register 11. Then, the error detector 14 stores the error information in a bit position corresponding to the hardware where the error is detected among the bits of the error log register 11.

Also, when accepting error information about an error detected in another node, the error detector 14 outputs an interrupt request for that error information via an interrupt dedicated line to the interrupt controller 45 of the MMB 40.

(Configuration of the MMB 40)

The MMB 40 is a controlling unit that performs firmware and various processes on a connected node. As for components particularly closely related to the present embodiment, the MMB 40 includes a switch 41, an I2C controller 42, a memory 43, a Central Processing Unit (CPU) 44, and the interrupt controller 45.

The switch 41 a communication board that includes a plurality of ports and connects to another node via an I2C interface. Specifically, for example, the switch 41 has the ports connected to the nodes, outputting data transmitted from each node to the I2C controller 42 and outputting data output from the I2C controller 42, which will be explained further below, to the transmission destination.

The I2C controller 42 controls each node connected to the switch 41 and performs conditional branching of data. Specifically, the I2C controller 42 receives data from a node via the switch 41, and then outputs the data to the CPU 44 or the firmware. Also, the I2C controller 42 transmits the result of the process performed by the CPU 44 and the firmware to a node via the switch 41.

The memory 43 has stored therein data and programs necessary for various processes by the CPU 44 and the interrupt controller 45, and also has stored therein firmware. The firmware stored in the memory 43 is read by the CPU 44 and the interrupt controller 45 for various processes. For example, the firmware detects that the interrupt controller 45 receives an interrupt request and, upon instruction by the CPU 44, obtains, from each node, error information about an error corresponding to that interrupt request via the I2C interface, thereby performing error analysis. Also, the firmware suppress acceptance of an error by masking during error analysis, and clears the error information after error analysis.

The CPU 44 performs various numerical-value calculations, information processing, device control, and others with programs, sequentially reads and interprets instruction strings called programs on the memory 43, and moves and processes data according to the interpretation result. Specifically, the CPU 44 reads the firmware on the memory 43 to perform the various processes. Also, when an interrupt request is received by the interrupt controller 45, the CPU 44 starts an error handling route to obtain error information about an error corresponding to the interrupt request from nodes via the I2C interface. Then, the CPU 44 stops the currently-performing process and starts an interrupt process.

The interrupt controller 45 receives an interrupt request from each node. Specifically, for example, when an error occurs at the node A 10, the interrupt controller 45 receives an interrupt request not via the I2C interface but via an interrupt dedicated line from the error log register 11 of the node A 10, and reports to the CPU 44 that the interrupt has been received. With this, the CPU 44 performs an interrupt process with priority.

(Circuitry Configuration of Each Node)

Figure 2:
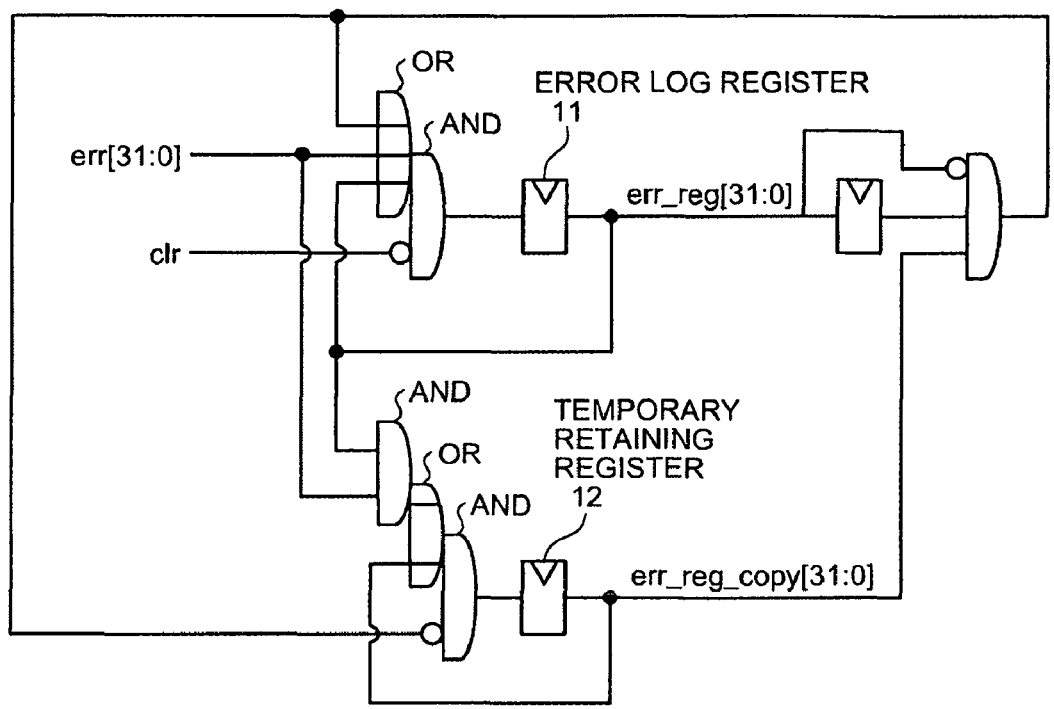
FIG. 2 is a drawing for explaining a circuitry configuration of each node in the information processing apparatus according to the first embodiment.

Next, a circuitry configuration of each node is explained by using FIG. 2. FIG. 2 is a drawing for explaining a circuitry configuration of each node in the information processing apparatus according to the first embodiment. Here, the node A 10 is taken as an example for explanation.

As depicted in FIG. 2, when error information detected by the error detector 13 or 14 is reported as err[31:0], as depicted, the node A 10 performs an AND operation between 32 bits obtained from an OR operation and 1 bit indicative of information about a clear request (clr), thereby determining whether a clear instruction has been input. If a clear instruction has not been input, the node A 10 sets the error information in the error log register 11 (err_reg[31:0]). At this time, when the corresponding bit has already been set, the node A 10 sets the error information in the temporary retaining register 12 (err_reg_copy[31:0]).

Then, upon an instruction of clr of the register from the firmware of the MMB 40, the node A 10 performs an AND operation between 32 bits obtained from an OR operation and 1 bit indicative of information about clr to clear the set bit of the error log register 11 (err_reg[31:0]). At this time, when the corresponding bit of the temporary retaining register 12 (err_reg_copy[31:0]) is set, the node A 10 sets the same bit of the error log register 11 (err_reg[31:0]) again, and the temporary retaining register 12 (err_reg_copy[31:0]) is cleared.

[Process by the Information Processing Apparatus]

Figure 3:
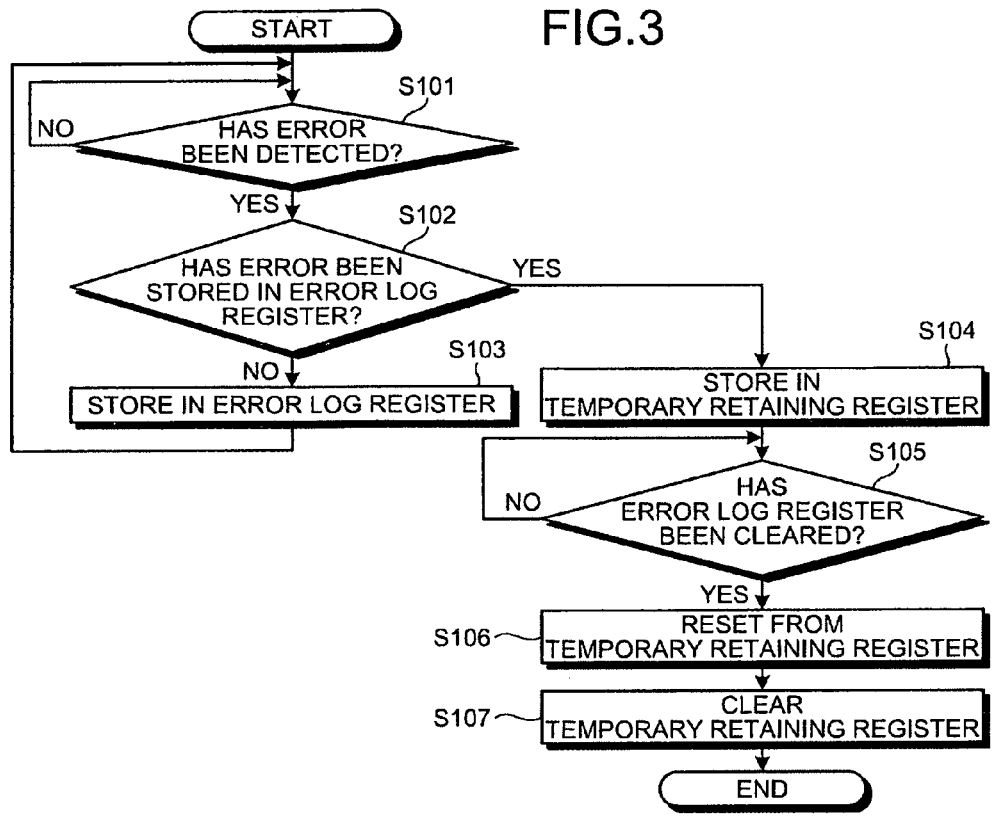
FIG. 3 is a flowchart of a flow of a process at the nodes in the information processing apparatus according to the first embodiment.
Figure 4:
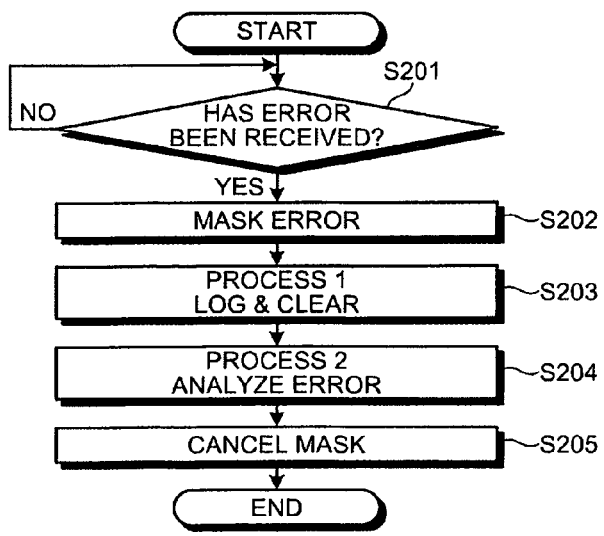
FIG. 4 is a flowchart of a flow of a process at an MMB in the information processing apparatus according to the first embodiment.
Figure 5:
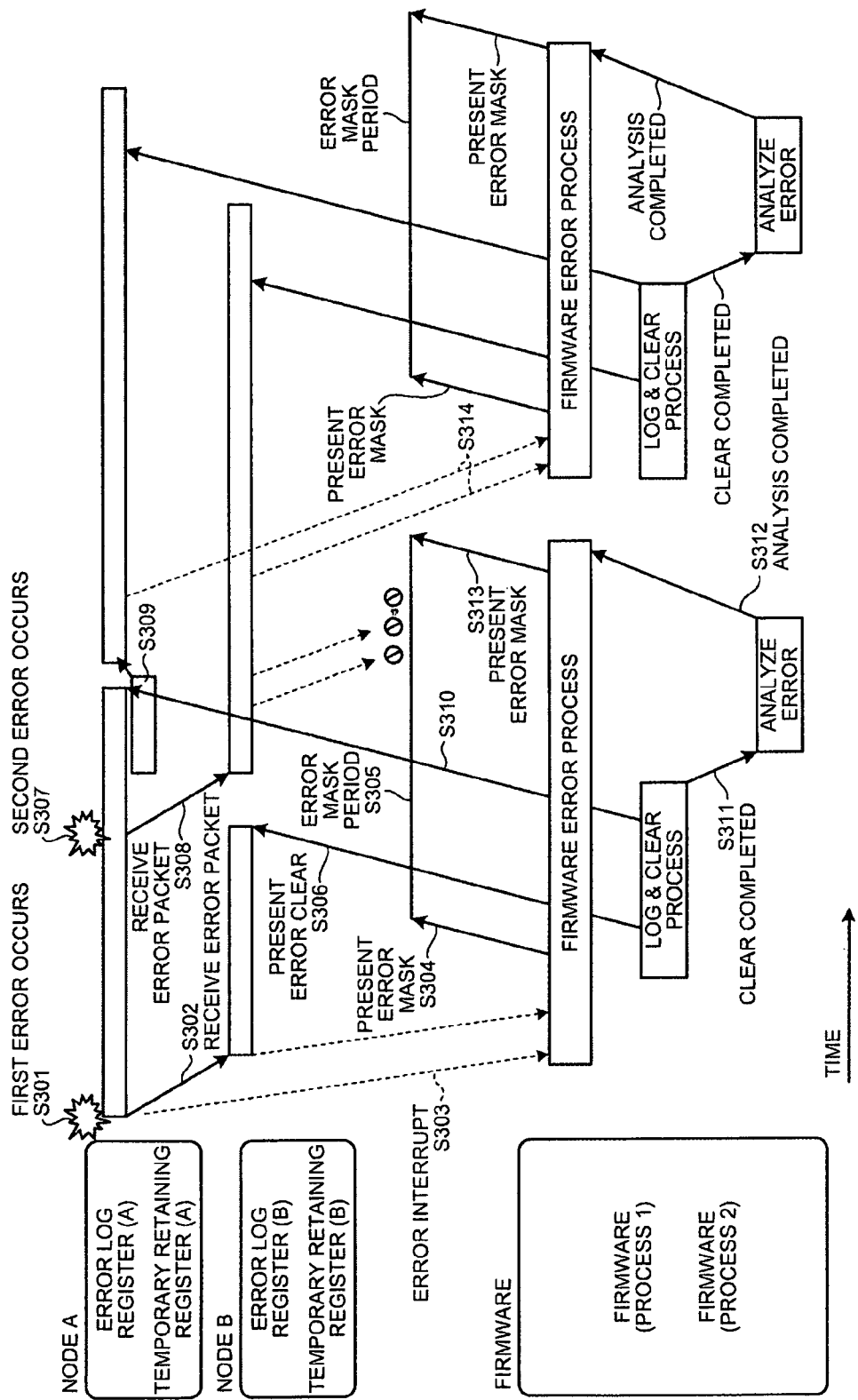
FIG. 5 is a time chart of a process to be performed in the information processing apparatus according to the first embodiment.

Next, the process of the information processing apparatus is explained by using FIGS. 3 to 5. FIG. 3 is a flowchart of a flow of a process at the nodes in the information processing apparatus according to the first embodiment. FIG. 4 is a flowchart of a flow of a process at the MMB in the information processing apparatus according to the first embodiment. FIG. 5 is a time chart of a process to be performed in the information processing apparatus according to the first embodiment.

(Flow of Process at Each Node)

As depicted in FIG. 3, upon detection of an error (Yes at Step S101), each node determines whether error information has already been stored at a bit position in the error log register 11 corresponding to that error (Step S102).

If the error information has not yet been stored (No at Step S102), each node stores the error information at the bit position in the error log register 11 corresponding to that error (Step S103), and then the procedure returns to Step S101.

On the other hand, if the error information has already been stored (Yes at Step S102), each node stores the error information at a bit position in the temporary retaining register 12 corresponding to that error (Step S104).

Thereafter, when the error information in the error log register 11 is cleared by the firmware (Yes at Step S105), each node obtains error information at the same bit position as that of the cleared error information from the temporary retaining register 12, and then stores the obtained error information at the relevant bit position in the error log register 11 (Step S106). Then, each node clears the error information stored at the bit position in the temporary retaining register 12 from which the error information was obtained (Step S107).

(Flow of Process at the MMB)

As depicted in FIG. 4, upon reception of an error from any of the nodes (Yes at Step S201), the MMB 40 once masks subsequent error reports to prevent errors from being accepted (Step S202).

The MMB 40 then stores error information of each node transmitting the error information, and clears the information at the bit position corresponding to that error stored in the error log register of each node (Step S203).

The MMB 40 then performs an error analyzing process by using the received error information (Step S204). When the process ends, the MMB 40 cancels mask to be in a state of capable of receiving subsequent error reports (Step S205).

(Time Chart)

Next, a time chart of the process to be performed by the information processing apparatus according to the first embodiment is explained by using FIG. 5. Here, the node A 10 and the node B 30 are taken as an example for explanation.

As depicted in FIG. 5, when detecting an error (Step S301), the node A 10 stores the error information in the error log register 11 and also transfers an invalid packet due to the error to the node B 30 (Step S302). Then, the nodes A 10 and B 30 each produce an error interrupt output to the firmware (Step S303).

The firmware of the MMB 40 once masks subsequent error reports (Steps S304 and S305), and first logs (records) and then clears the error information of the node B 30 (Step S306).

Then, before the error information of the node A 10 is cleared by the firmware, the node A 10 detects an error of the same type as that of the error detected previously (an error corresponding to the same bit position) (Step S307), and then transfers an invalid packet due to the error to the node B 30 (Step S308).

Then, since error information has already been stored at the bit position in the error log register 11 having stored therein the error information of the newly-detected error, the node A 10 stores the new error information in the temporary retaining register 12 (Step S309).

Thereafter, the firmware of the MMB 40 logs (records) and then clears the error information of the node A 10 (Step S310). That is, the first error information is cleared.

Then, after clearing the error information of the node A 10 and the node B 30, the firmware performs error analysis by using the obtained error information. When the error analysis ends, the firmware cancels error interrupt mask to be in a state of capable of accepting error interrupts (Steps S311 to S313).

In this manner, the firmware becoming in a state of capable of accepting error interrupt accepts not the first error information but new error information from both of the node A 10 and the node B 30 (Step S314). Then, the new error information is subjected to the same steps as explained above.

[Effects of the First Embodiment]

In this manner, according to the first embodiment, a node includes the temporary retaining register 12 that retains first error information detected by the error detector 13 and second error information detected by the error detector 14 at respectively corresponding bit positions in the error log register 11; retains first error information that is different from the first error information stored in the error log register 11 is newly detected by the error detector 13 and second error information that is different from the second error information stored in the error log register 11 and is newly detected by the error detector 14 at respectively corresponding bit positions; and, when the first or second error information retained in the error log register 11 is initialized by the MMB 40, retains, in a retaining unit, error information corresponding to the initialized first or second error information from among the retained first and second error information. The MMB 40 includes firmware that causes the first and second error information retained in the error log register 11 to be read by the controlling unit and causes the first or second error information to be initialized by the controlling unit. With this, only by using registers without requiring complicated processes, the firmware can correctly specify a suspicious component without awareness and irrespectively of the time difference in clear timing of the firmware.

(Second Embodiment)

While the exemplary embodiment has been explained, the information processing apparatus and information processing method can be implemented in various different embodiments other than those explained above. Different embodiments are now explained for each of the following sections: (1) single node mode, (2) clear-suppression control, (3) temporary retaining flag of a single bit, and (4) system configuration and others.

(1) Single Node Mode

Figure 6:
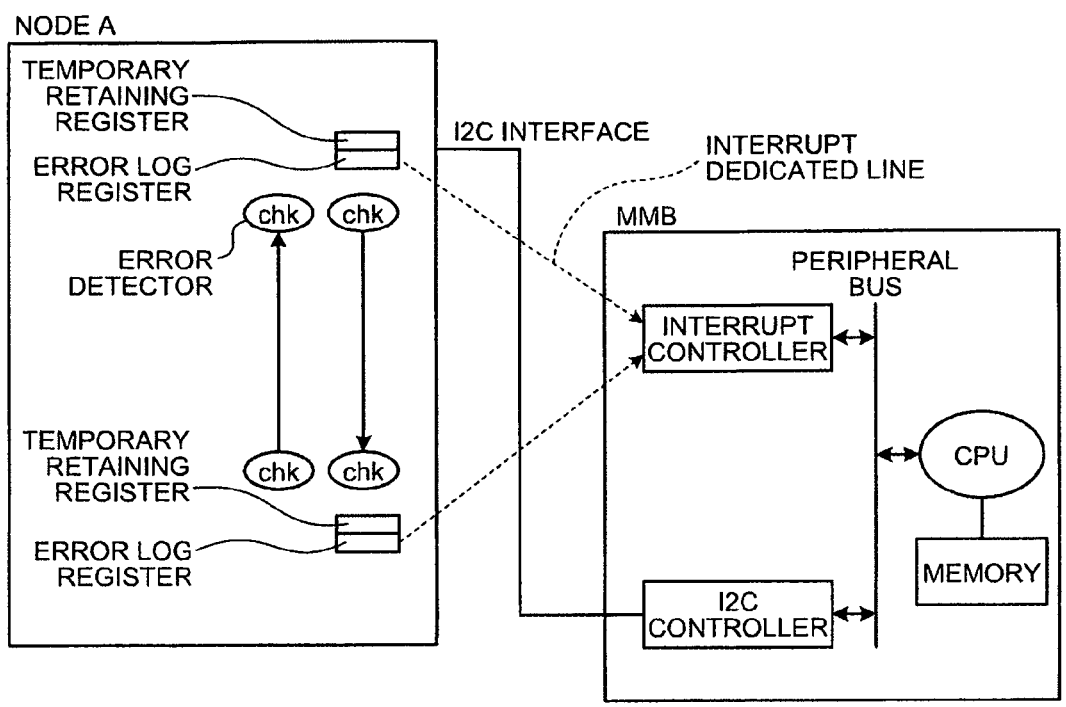
FIG. 6 is a drawing of an exemplary configuration when a single node is connected.

For example, in the first embodiment, the example is explained in which a plurality of nodes are connected to the MMB. However, the information processing apparatus and information processing method disclosed herein is not meant to be restricted to this. The present apparatus can be similarly applied to a case in which a single node is connected to the MMB. Specifically, for example, as depicted in FIG. 6, the present apparatus can be similarly applied to a case in which a node A and an MMB are connected to each other. Also, although the example is depicted in FIG. 6 in which two sets of an error log register and a temporary retaining register are provided to the node A, this is not meant to be restrictive. Alternatively, one error log register and one temporary retaining register may be provided. FIG. 6 is a drawing of an exemplary configuration when a single node is connected.

(2) Clear-Suppression Control

Also, the node according to the first embodiment accepts an instruction for clearing the error log register from the firmware for clearing. However, the information processing apparatus and information processing method disclosed herein is not meant to be restricted to this. When a clear instruction is accepted, clearing may be suppressed. Specifically, when error information is set in the temporary retaining register, the node can prevent clearing of a bit of the error log register corresponding to the bit position of the set error information.

Figure 7:
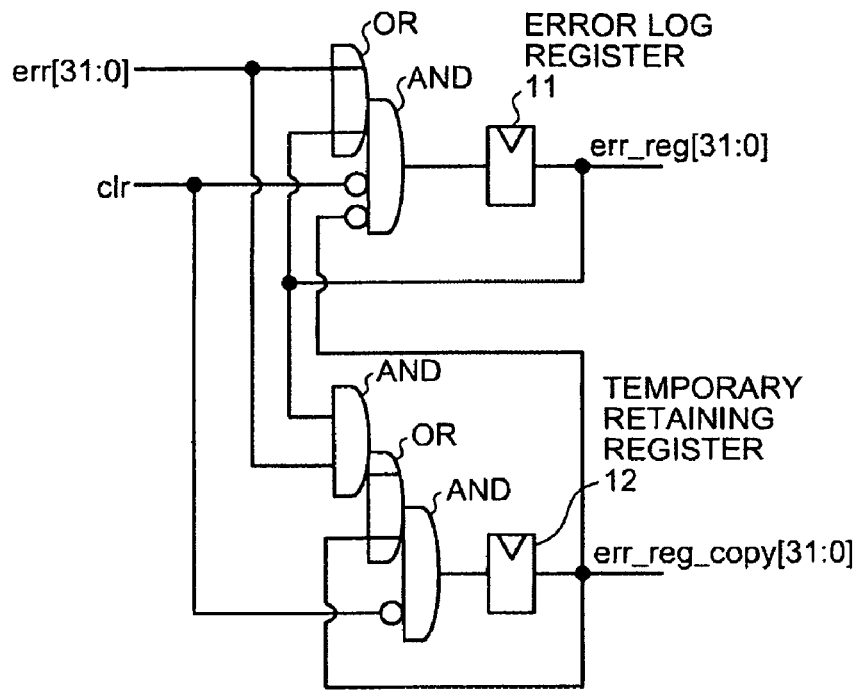
FIG. 7 is a drawing of an exemplary circuitry configuration of a node performing a clearing-suppression control.

Specifically, for example, clearing can be suppressed with a circuit depicted in FIG. 7. The process of the circuit depicted in FIG. 7 is different from that depicted in FIG. 5 explained in the first embodiment in that, when an AND operation between the error information (err_reg[31:0]) and reversed clear information (1 bit) is performed, (err_reg_copy[31:0]) of the temporary retaining register is further included for the AND operation. FIG. 7 is a drawing of an exemplary circuitry configuration of a node performing a clearing-suppression control.

With this, a process of setting again from the temporary retaining register to the error log register can be omitted, thereby preventing a decrease in processing performance as an entire apparatus and achieving a high-speed interrupt process.

(3) Temporary Retaining Flag of a Single Bit

Also, in the first embodiment, the example of using a temporary retaining register of 32 bits similar to the error register of 32 bits is explained. However, the information processing apparatus and information processing method disclosed herein is not meant to be restricted to this. The process goes similarly when a temporary retaining register of a single bit is used. In this manner, when a flag is set to the temporary retaining register of a single bit, clearing can be suppressed, and the flag of the temporary retaining register can be cleared.

Figure 8:
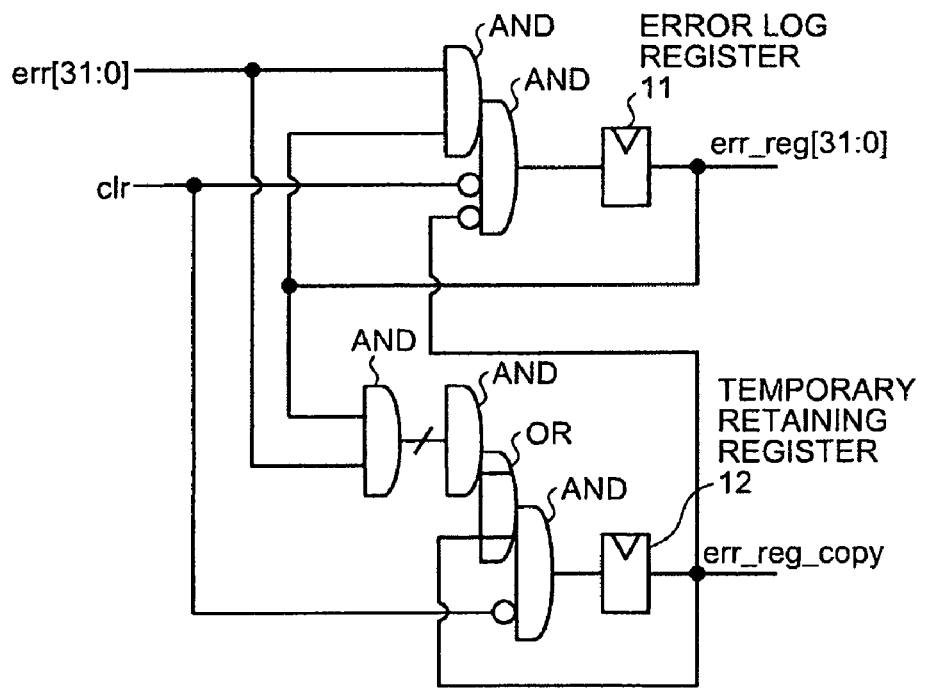
FIG. 8 is a drawing of an exemplary circuitry configuration of a node having a temporary retaining register of a single bit.
Figure 9:
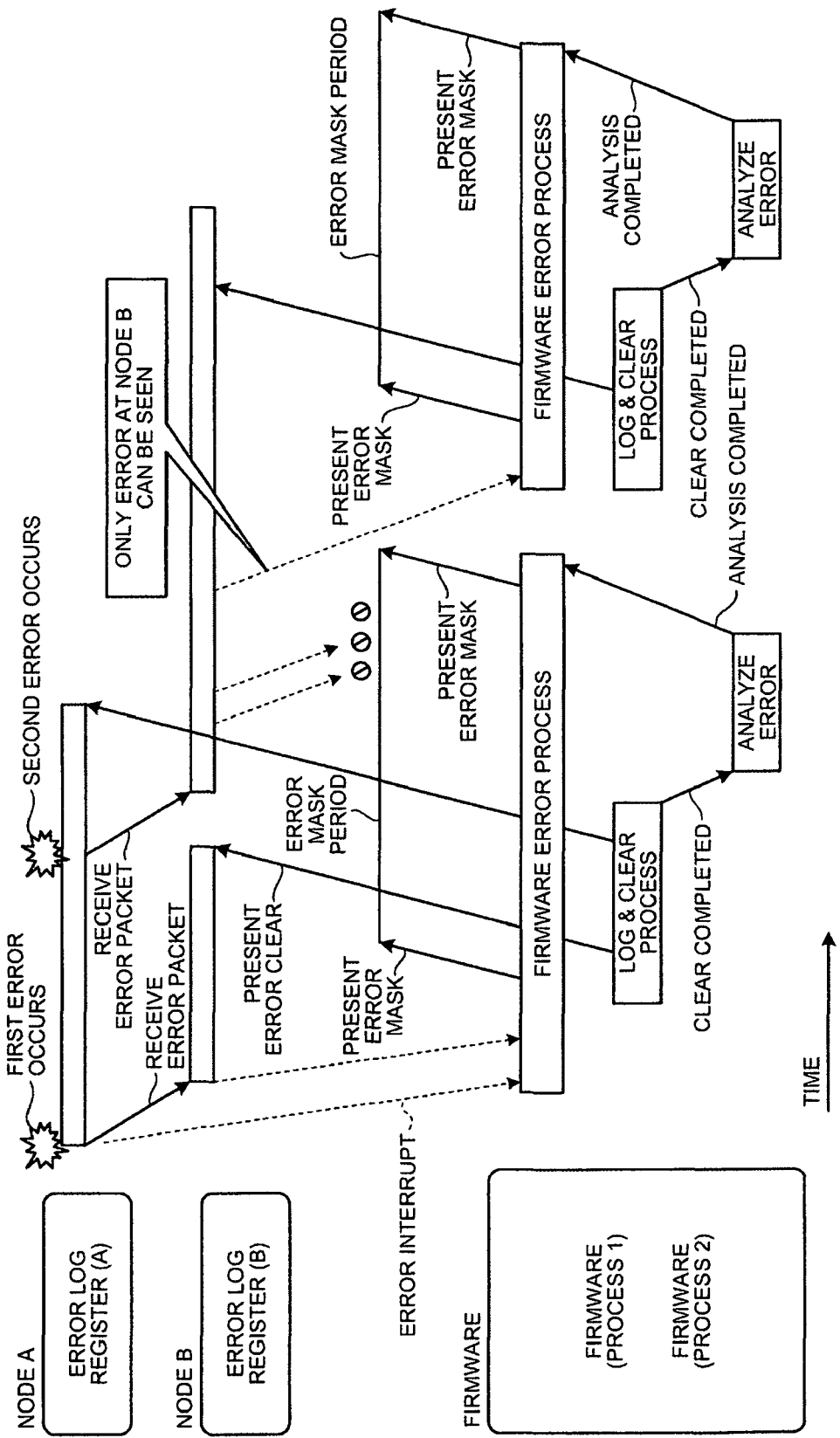
FIG. 9 is a drawing for explaining a conventional technology.

Specifically, for example, when a temporary retaining register of a single bit is used, a circuit depicted in FIG. 8 can achieve this. The process of the circuit depicted in FIG. 8 is different from that depicted in FIG. 5 explained in the first embodiment in that, in the temporary retaining register, an AND operation between the error information (err_reg[31:0]) stored therein and the error information (err_reg[31:0]) of a new error is performed over the entire 32 bits. Upon receiving this operation result, the node sets a flag, such as "1" or "0", at the temporary retaining register. When the flag indicates "1", a control for suppressing clearing of the error log register is performed. FIG. 8 is a drawing of an exemplary circuitry configuration of a node having a temporary retaining register of a single bit.

With this, no temporary retaining register of 32 bits is required to be provided. Even when a temporary retaining register of a minimum configuration of 1 bit is used, the firmware can correctly specify a suspicious component without awareness and irrespectively of the time difference in clear timing of the firmware.

(4) System Configuration and Others

Also, each component depicted is conceptual in function, and is not necessarily physically configured as depicted. That is, the specific patterns of distribution and unification of the components are not meant to be restricted to those depicted in the drawings. All or part of the components can be functionally or physically distributed or unified in arbitrary units according to various loads and the state of use. Furthermore, all or arbitrary part of the process functions performed in each component can be achieved by a CPU and a program analyzed and executed on that CPU, or can be achieved as hardware with a wired logic.

Still further, among the processes explained in the embodiments, all or part of the processes explained as being automatically performed may be manually performed, or all or part of the processes explained as being manually performed may be automatically performed through a known method. In addition, the process procedure, the control procedure, specific names, and information including various data and parameters explained in the specification and depicted in the drawings can be arbitrarily changed unless otherwise specified.

According to the embodiments of the invention disclosed herein, firmware can correctly specify a suspicious component without awareness and irrespectively of the time difference in clear timing of the firmware.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing apparatus comprising:
   a node; and
   a system controlling apparatus connected to the node,
   wherein the node comprising:
      a first detecting unit that detects first error information indicating a level or message of a fault state of hardware;
      a second detecting unit that detects second error information indicating the level or message of the fault state of hardware and different from the first error information;
      a retaining unit that retains the first error information and the second error information at corresponding bit positions; and
      a temporary retaining unit that retains new first error information that is different from the first error information stored in the retaining unit and is newly detected by the first detecting unit and new second error information that is different from the second error information stored in the retaining unit and is newly detected by the second detecting unit, in corresponding bit positions, and when the first or second error information retained in the retaining unit is initialized by the system controlling apparatus, causes the retaining unit to store error information corresponding to the initialized first or second error information from among the retained new first and second error information, and
   wherein the system controlling apparatus comprising:
      a controlling unit connected to the retaining unit; and
      a firmware that causes the controlling unit to read into the first and second error information retained in the retaining unit and causes the controlling unit to initialize the new first or second error information.

2. The information processing apparatus according to claim 1, wherein when the first or second error information is retained in the temporary retaining unit, the controlling unit further suppresses initialization of the first or second error information retained at the bit position corresponding to the first or second error information in the retaining unit, and causes the system controlling apparatus to initialize the first or second error information retained in the temporary retaining unit.

3. An information processing apparatus comprising:
   a node; and
   a system controlling apparatus connected to the node,
   wherein the node comprising:
      a first detecting unit that detects first error information indicating a level or message of a fault state of hardware;
      a second detecting unit that detects second error information indicating the level or message of the fault state of hardware and different from the first error information;
      a retaining unit that retains the first error information detected by the first detecting unit and the second error information detected by the second detecting unit at corresponding bit positions; and
      a flag retaining unit that retains an error flag when the first error information detected by the first detecting unit and the second error information detected by the second detecting unit are retained in the retaining unit, and suppresses initialization of the first or second error information by the system controlling apparatus when retaining the error flag, and
   wherein the system controlling apparatus comprising:
      a controlling unit connected to the retaining unit; and
      a firmware that causes the controlling unit to read into the first and second error information retained in the retaining unit and causes the controlling unit to initialize the new first or second error information.

4. An information processing apparatus comprising:
   a first node;
   a second node connected to the first node; and
   a system controlling apparatus connected to the first and second nodes,
   wherein the first node comprising:
      a first detecting unit that detects first error information indicating a level or message of a fault state of hardware;
      a first retaining unit that retains the first error information detected by the first detecting unit; and
      a first temporary retaining unit that retains new first error information that is different from the first error information stored in the first retaining unit and is newly detected by the first detecting unit, and when the first error information retained in the first retaining unit is initialized by the system controlling apparatus, causes the first retaining unit to retain the retained first error information,
   wherein the second node comprising:
      a second detecting unit that detects second error information indicating the level or message of the fault state of hardware;
      a second retaining unit that retains the second error information detected by the second detecting unit; and
      a second temporary retaining unit that retains new second error information that is different from the second error information stored in the second retaining unit and is newly detected by the second detecting unit, and when the second error information retained in the second retaining unit is initialized by the system controlling apparatus, causes the second retaining unit to retain the retained new second error information, and
the system controlling apparatus comprising:
a controlling unit connected to the first and retaining units; and
a firmware that causes the controlling unit to read into the first and second error information retained in the first and second retaining units, and causes the controlling unit to initialize the first and second error information.

5. A method of processing information for an information processing apparatus including a node having a retaining unit, and a system controlling apparatus having a controlling unit connected to the node, the method comprising:
detecting first error information indicating a level or message of a fault state of hardware;
detecting second error information indicating the level or message of the fault state of hardware and different from the first error information;
retaining the first error information obtained by detecting first error information and the second error information obtained by detecting second error information at corresponding bit positions;
retaining new first error information that is different from the first error information and is newly detected and new second error information that is different from the second error information and is newly detected, in corresponding bit positions, and when the first or second error information is initialized, storing error information corresponding to the initialized first or second error information from among the retained new first and second error information;
controlling to connect the controlling unit to the retaining unit; and
causing the controlling unit to read into the first and second error information retained in the retaining unit and causing the controlling unit to initialize the new first or second error information.

6. The method according to claim 5, wherein controlling to connect the controlling unit further comprising:
when the first or second error information is retained, suppressing initialization of the first or second error information retained at the bit position corresponding to the first or second error information; and
initializing the first or second error information by the system controlling apparatus.

7. A method of processing information for an information processing apparatus including a node having a retaining unit and a system controlling apparatus having a controlling unit connected to the node, the method comprising:
detecting first error information indicating a level or message of a fault state of hardware;
detecting second error information indicating the level or message of the fault state of hardware and different from the first error information;
retaining the first error information detected and the second error information detected at corresponding bit positions; and
retaining an error flag when the first error information and the second error information are retained at the error information retaining step and suppressing initialization of the first or second error information by the system controlling apparatus when the error flag is retained;
controlling to connect the controlling unit to the retaining unit; and
reading into the first and second error information and initializing the new first or second error information.

8. A method of processing information for an information processing apparatus including a first node having a first retaining unit, a second node having a second retaining unit connected to the first node, and a system controlling apparatus having a controlling unit connected to the first and second nodes, the method comprising:
detecting first error information indicating a level or message of a fault state of hardware;
retaining the first error information detected at the first error information detecting step;
retaining new first error information that is different from the first error information and is newly detected at the first error information detecting step, and when the first error information is initialized by the system controlling apparatus, causing the first retaining unit to retain the new first error information;
detecting second error information indicating the level or message of the fault state of hardware;
retaining the second error information detected at the second error information detecting step;
retaining new second error information that is different from the second error information and is newly detected at the second error information detecting step, and when the second error information is initialized by the system controlling apparatus, causing the second retaining unit to retain the new second error information;
controlling to connect the controlling unit to the first and second retaining units; and
causing the controlling unit to read into the first and second error information retained in the first and second retaining units, respectively, and causing the controlling unit to initialize the new first and second error information.

* * * * *

UNITED STATES PATENT AND TRADEMARK OFFICE
CERTIFICATE OF CORRECTION

PATENT NO.       : 8,239,051 B2
APPLICATION NO.  : 12/382487
DATED            : August 7, 2012
INVENTOR(S)      : Makoto Hataida It is certified that error appears in the above-identified patent and that said Letters Patent is hereby corrected as shown below:

Column 11, Line 6, In Claim 4, delete "first and" and insert -- first and second --, therefor.

Signed and Sealed this
Twenty-third Day of October, 2012

David J. Kappos
*Director of the United States Patent and Trademark Office*